US012169706B2

(12) United States Patent
Cerny et al.

(10) Patent No.: US 12,169,706 B2
(45) Date of Patent: *Dec. 17, 2024

(54) APPLICATION PATCHING USING VARIABLE-SIZED UNITS

(71) Applicant: Sony Interactive Entertainment LLC, San Mateo, CA (US)

(72) Inventors: Mark Evan Cerny, Burbank, CA (US); Simon Whittaker, San Francisco, CA (US); Akiyuki Hatakeyama, Tokyo (JP); Jeffrey Litz, San Mateo, CA (US); Varun Bhadauria, Union City, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 380 days.

This patent is subject to a terminal disclaimer.

(21) Appl. No.: 17/722,908

(22) Filed: Apr. 18, 2022

(65) Prior Publication Data

US 2022/0236979 A1 Jul. 28, 2022

Related U.S. Application Data

(63) Continuation of application No. 16/526,440, filed on Jul. 30, 2019, now Pat. No. 11,307,841.

(51) Int. Cl.
*G06F 8/65* (2018.01)
*G06F 16/174* (2019.01)
(Continued)

(52) U.S. Cl.
CPC ............ *G06F 8/65* (2013.01); *G06F 16/1744* (2019.01); *G06F 16/1752* (2019.01);
(Continued)

(58) Field of Classification Search
CPC ........ G06F 21/602; G06F 21/64; G06F 21/79; G06F 16/1744; G06F 16/1752;
(Continued)

(56) References Cited

U.S. PATENT DOCUMENTS 6,466,999 B1   10/2002   Sliger et al.
8,458,233 B2 *  6/2013   Gladwin ............. G06F 11/1092
                                                       709/219
(Continued)

FOREIGN PATENT DOCUMENTS

JP         2010011101 A      1/2010

OTHER PUBLICATIONS

Final Office Action for U.S. Appl. No. 16/526,534, dated Jun. 16, 2022.
(Continued)

*Primary Examiner* — Linglan Edwards
(74) *Attorney, Agent, or Firm* — JDI PATENT; Joshua D. Isenberg; Robert Pullman

(57) ABSTRACT

A method, system and non-transitory computer readable instructions for application patching comprising, concatenating compressed data or uncompressed data or a mixture of compressed and uncompressed data into a continuous data set into a continuous data set and dividing the continuous data set into variable sized data chunks. Compressing each of the variable sized data chunks and dividing each of the variable sized data chunks into fixed size data blocks. Encrypting the fixed size data blocks to generate encrypted fixed size data blocks and storing the encrypted fixed sized data blocks or sending the encrypted fixed size data blocks over a network.

20 Claims, 10 Drawing Sheets

(51) Int. Cl.
  *G06F 21/60*    (2013.01)
  *H04L 9/40*    (2022.01)
  *H04L 69/04*    (2022.01)
(52) U.S. Cl.
  CPC ........ *G06F 21/602* (2013.01); *H04L 63/0428* (2013.01); *H04L 69/04* (2013.01)
(58) Field of Classification Search
  CPC ... G06F 8/65; H04L 63/0428; H04L 63/0435; H04L 67/06; H04L 67/34
  See application file for complete search history.

(56) References Cited

U.S. PATENT DOCUMENTS

| | | | |
|---|---|---|---|
| 8,769,311 B2 * | 7/2014 | Koifman | H04L 9/0637 |
| | | | 713/181 |
| 9,098,375 B2 | 8/2015 | Narkinsky et al. | |
| 9,432,298 B1 | 8/2016 | Smith | |
| 10,095,635 B2 * | 10/2018 | Abbas | G06F 3/0659 |
| 10,210,170 B2 * | 2/2019 | Kuhtz | G06F 16/9024 |
| 10,346,256 B1 | 7/2019 | Levin-Michael et al. | |
| 11,221,778 B1 * | 1/2022 | Miller | G06F 16/1752 |
| 11,262,927 B2 | 3/2022 | Cerny et al. | |
| 2003/0028867 A1 | 2/2003 | Kryloff et al. | |
| 2005/0235043 A1 | 10/2005 | Teodosiu et al. | |
| 2006/0004808 A1 | 1/2006 | Hsu et al. | |
| 2006/0005047 A1 * | 1/2006 | Lekatsas | G06F 21/79 |
| | | | 713/193 |
| 2006/0130046 A1 | 6/2006 | O'Neill | |
| 2007/0261050 A1 | 11/2007 | Nakano et al. | |
| 2009/0100112 A1 | 4/2009 | Sharma et al. | |
| 2009/0148125 A1 | 6/2009 | Watson et al. | |
| 2010/0088296 A1 | 4/2010 | Periyagaram et al. | |
| 2010/0318759 A1 | 12/2010 | Hamilton et al. | |
| 2011/0099326 A1 | 4/2011 | Jung et al. | |
| 2011/0246422 A1 | 10/2011 | Gonzalez | |
| 2014/0095439 A1 | 4/2014 | Ram | |
| 2015/0012504 A1 | 1/2015 | Akirav et al. | |
| 2015/0301823 A1 | 10/2015 | Hatakeyama | |
| 2016/0157148 A1 | 6/2016 | Kato et al. | |
| 2016/0357678 A1 | 12/2016 | Kluesing et al. | |
| 2016/0359972 A1 | 12/2016 | Calkowski et al. | |
| 2017/0076090 A1 | 3/2017 | Horne et al. | |
| 2017/0131934 A1 | 5/2017 | Kaczmarczyk et al. | |
| 2017/0164253 A1 | 6/2017 | Fujinami | |
| 2017/0366999 A1 | 12/2017 | Tsuboi et al. | |
| 2018/0336340 A1 | 11/2018 | Horne et al. | |
| 2019/0108099 A1 | 4/2019 | Mazumdar | |
| 2019/0122317 A1 | 4/2019 | Hunn et al. | |
| 2020/0341666 A1 | 10/2020 | Bassov et al. | |
| 2021/0034349 A1 | 2/2021 | Hatakeyama et al. | |

OTHER PUBLICATIONS

Notice of Allowance for U.S. Appl. No. 16/526,473, dated May 4, 2022.
International Search Report & Written Opinion dated Aug. 31, 2020 for International Patent Application No. PCT/US2020/040174.
International Search Report and Written Opinion dated Oct. 13, 2020 for International Patent Application No. PCT/US2020/040172.
International Search Report and Written Opinion dated Oct. 9, 2020 for International Patent Application No. PCT/US2020/040177.
International Search Report and Written Opinion dated Sep. 28, 2020 for International Patent Application No. PCT/US2020/040170.
Non-final Office Action dated Jan. 27, 2022 for U.S. Appl. No. 16/526,473.
Non-Final Office Action for U.S. Appl. No. 16/526,502, dated Jul. 8, 2020.
Notice of Allowance for U.S. Appl. No. 16/526,440, dated Dec. 29, 2021.
Yi Li Gong et al, "A Distributed File System with Variable Sized Objects for Enhanced Random Writes" in Section B: Computer and Communications Networks and Systems, The Computer Journal, vol. 59, No. 10, The British Computer Society 2016.

* cited by examiner

FIG. 5    Previous location of DATA

APPLICATION PATCHING USING VARIABLE-SIZED UNITS

CLAIM OF PRIORITY

This application is a continuation of U.S. patent application Ser. No. 16/526,440 filed Jul. 30, 2019, the entire disclosures of which are incorporated herein by reference.

CROSS-REFERENCE TO RELATED APPLICATION

This application is related co-pending U.S. patent application Ser. No. 16/526,473 and to U.S. patent application Ser. No. 16/526,502, now U.S. Pat. No. 11,262,927 and to U.S. patent application Ser. No. 16/526,534, all of which were filed Jul. 30, 2019, the entire disclosures of all of which are incorporated herein by reference.

FIELD OF THE INVENTION

Aspects of the present disclosure relate to encryption and compression, specifically aspects of the present disclosure relate to encryption and compression of data blocks for delivery over a network in a software patching system.

BACKGROUND OF THE INVENTION

Virtual delivery of files is becoming the standard for how users receive their applications. It has become an expectation that companies will support their applications by pushing updates to user's systems. Efficient virtual delivery of files and updates is often vital for the safety and usability of applications.

The rise of virtual marketplaces for applications, such as the Apple App store, Google Play store, Steam Store, Nintendo store, Microsoft Store, and PlayStation Store means that application developers must go through a third party to push updates and provide application downloads. Additionally, the updates and/or applications are often compressed for delivery and storage in order to be more efficient. Applications and/or updates pushed by application developers may also be encrypted to protect against piracy and unwanted examination of the files.

Virtual marketplaces are often more than simply a platform that allows for downloading of applications and updates. Many marketplaces are designed to be integral to the file system of the user device. As such, third party platforms have an interest in ensuring client devices have a long life and efficient file structures.

The introduction of Solid State Drives (SSD) has made file access extremely fast compared to Hard Disk Drives (HDD). Data blocks on SSDs are accessible all the time whereas accessibility of data blocks on an HDD is governed by the location of the read head and the speed of the platter. Despite the extreme improvement in performance, SSDs have several drawbacks. Firstly, the longevity of an SSD is dictated by the number of write and erase cycles the SSD can endure before no longer holding data after the SSD is powered off. Each Bit on an SSD can only be written and erased a number of times, after which the bit becomes unable to retain data without power, essentially losing the data when the device is powered off. Secondly, writing and erasing bits on SSDs occurs at different levels. SSD memory is organized into pages and blocks. A page contains a certain number of bits and each block has a certain number of pages. Data on an SSD cannot be overwritten and must first be deleted before a write can occur. Writes and reads on an SSD occur at the page level whereas deletions occur only on a block level. This means that if a block contains both data marked for deletion and valid data the valid data must be written to another location on the SSD when the block is deleted. The downside of this is that each deletion may result in additional writes to the SSD thus decreasing the longevity of the SSD.

Thus, a third party marketplace operator pushing application updates that are stored on SSD has an interest in reducing the amounts of writes and erases required to store and update applications. This interest competes with the interest of application developers who desire efficient and secure delivery of their applications and updates. As such, there is a need for a system or method that can efficiently and securely deliver applications and updates to users in a manner that requires as few data erasures and writes as possible.

It is within this context that aspects of the present disclosure arise.

BRIEF DESCRIPTION OF THE DRAWINGS

Aspects of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

The competing interests of third party marketplace operators and software developers when updating applications in SSD may be resolved by implementing variable sized data chunks for application data and update data according to aspects of the present disclosure. Variable sized data chunks allow more efficient application updates in terms of bytes written compared to a scheme implementing only fixed sized data blocks.

Application Patching

Figure 1:
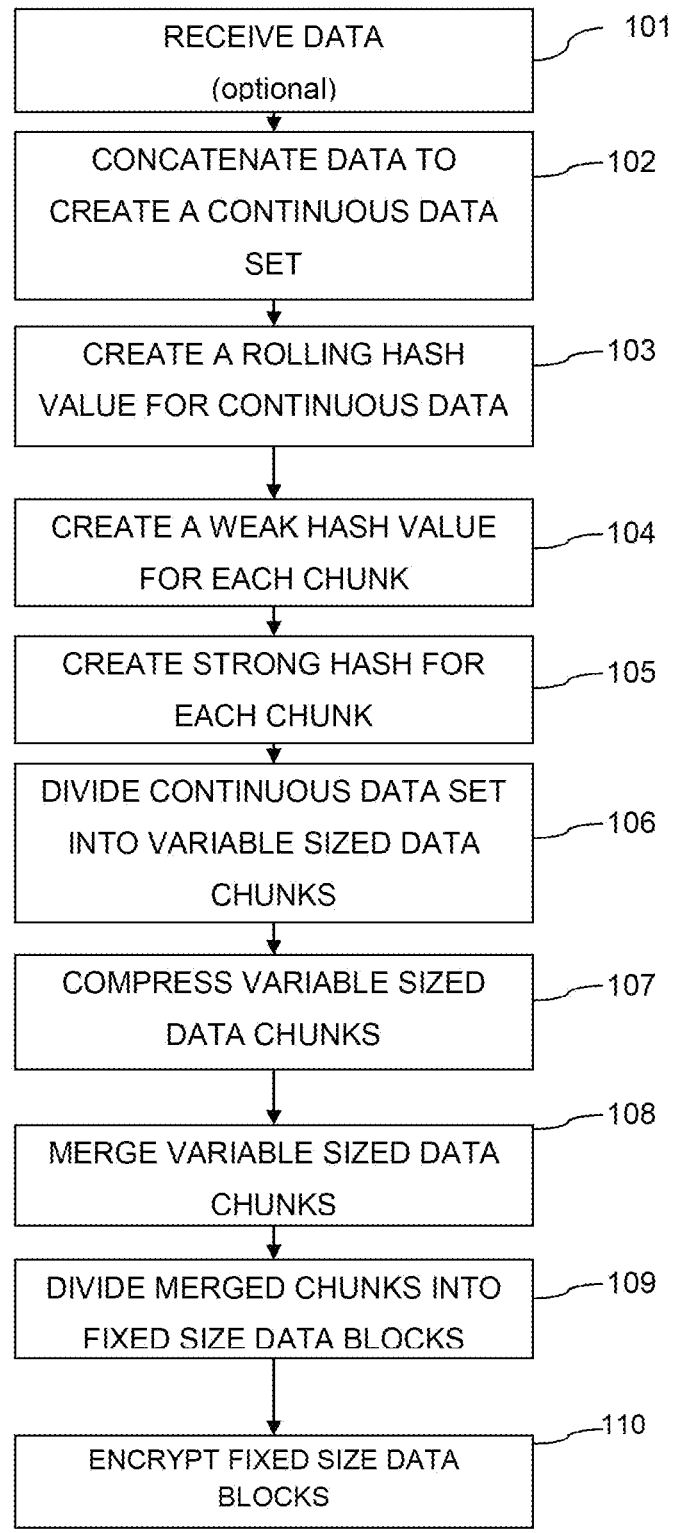
FIG. 1 is a flow diagram depicting a method for packaging data using variable sized blocks for updates according to aspects of the present disclosure.

FIG. 1 depicts a method for packaging data using variable sized blocks according to aspects of the present disclosure. This method may be carried out by a tool used by an application developer or a third party virtual marketplace server or both. Initially, the tool or the server may receive application data as indicated at 101. The data received may be organized as an uncompressed set of data, compressed set of data or a mixture of the two, which are concatenated together creating a continuous data set, as indicated at 102. It is reasonable to expect that the application data will subsequently need to be patched and, as such, preparations for the patching process begin during packaging of application data. Initially application data chunk boundaries may be delineated; later the application data will be divided along these boundaries.

Hashes may be generated for a sliding window, as indicated at 103. According to aspects of the present disclosure, in some implementations, the sliding window may run the length of the continuous data set shifting the length of the sliding window each time it moves. In other embodiments, the sliding window may move less than length of the sliding window for example and without limitation, the sliding window may shift half its length. In yet other embodiments, the sliding window may shift more than its length for each movement for example and without limitation the sliding window may shift, a window length and a half each time it moves along the continuous data set. In yet other embodiments the sliding widow may shift an application chunk's distance from the previous window effectively taking a hash of a window of the beginning of each application chunk. In this way, successive hash values of windows of data (also known as rolling hash values) are generated for the continuous data set. In some implementations, the size of the sliding window also corresponds to a fixed encryption block size. The size of the sliding window may be for example and without limitation 64 kibibytes (KiB) or less. According to aspects of the present disclosure the rolling hash may take be created from a window at the beginning (or base) of each application chunk.

After a rolling hash is generated for the continuous data set a weak hash may be generated for each of the delineated application chunks in the continuous application data set 104. The weak hash algorithm may be for example and without limitation a checksum. The weak hash may be stored separately or part of metadata for the application.

A strong hash may be generated for each of the delineated variable sized chunks, as indicated at 105. The strong hash of each delineated variable sized data chunk may be stored separately or as metadata. A strong hash may be any known cryptographic hash function in the art such as SHA-3-256, SHA-2-256, SHA-512, MD-5 and the like. The strong hash value for the data set may be stored in memory separate from the continuous data set or as part of metadata for the application data or as part of the application data.

Once hash values are generated for the delineated continuous data set, the data may be divided in to variable sized data chunks, as indicated at 106. Generally, the uncompressed continuous data will be split into smaller variable sized data chunks, which can vary in size between 2 mebibytes (MiB) and 100 kibibytes (KiB). As will be discussed below, developer feedback may be used to guide division of the continuous data set. After the delineated continuous data set is divided into variable sized chunks, each variable sized chunk is compressed, as indicated at 107. The variable sized data chunk may be compressed by any known compression algorithm in the art for reducing data size for example and without limitation, Lempel-Ziv-Welsh compression algorithm (LZW), ZLIB, DEFLATE and the like.

After compression, the compressed variable sized data chunks are merged 108 and then divided into fixed sized blocks, as indicated at 109. Fixed sized blocks are necessary for encryption and may be smaller than the variable sized data chunks. For example and without limitation the fixed size blocks may be less than or equal to 64 KiB. After the variable sized data chunks are divided into fixed sized data blocks, the data blocks are encrypted, as indicated at 110. The encryption method may be any strong symmetric cryptographic method known in the art for protecting communication for example and without limitation DES, 3DES, CAST5 or the like. The Encrypted data blocks may then be stored or sent to a marketplace server or client device. The Encrypted data blocks may be application data or patch data.

Figure 3:
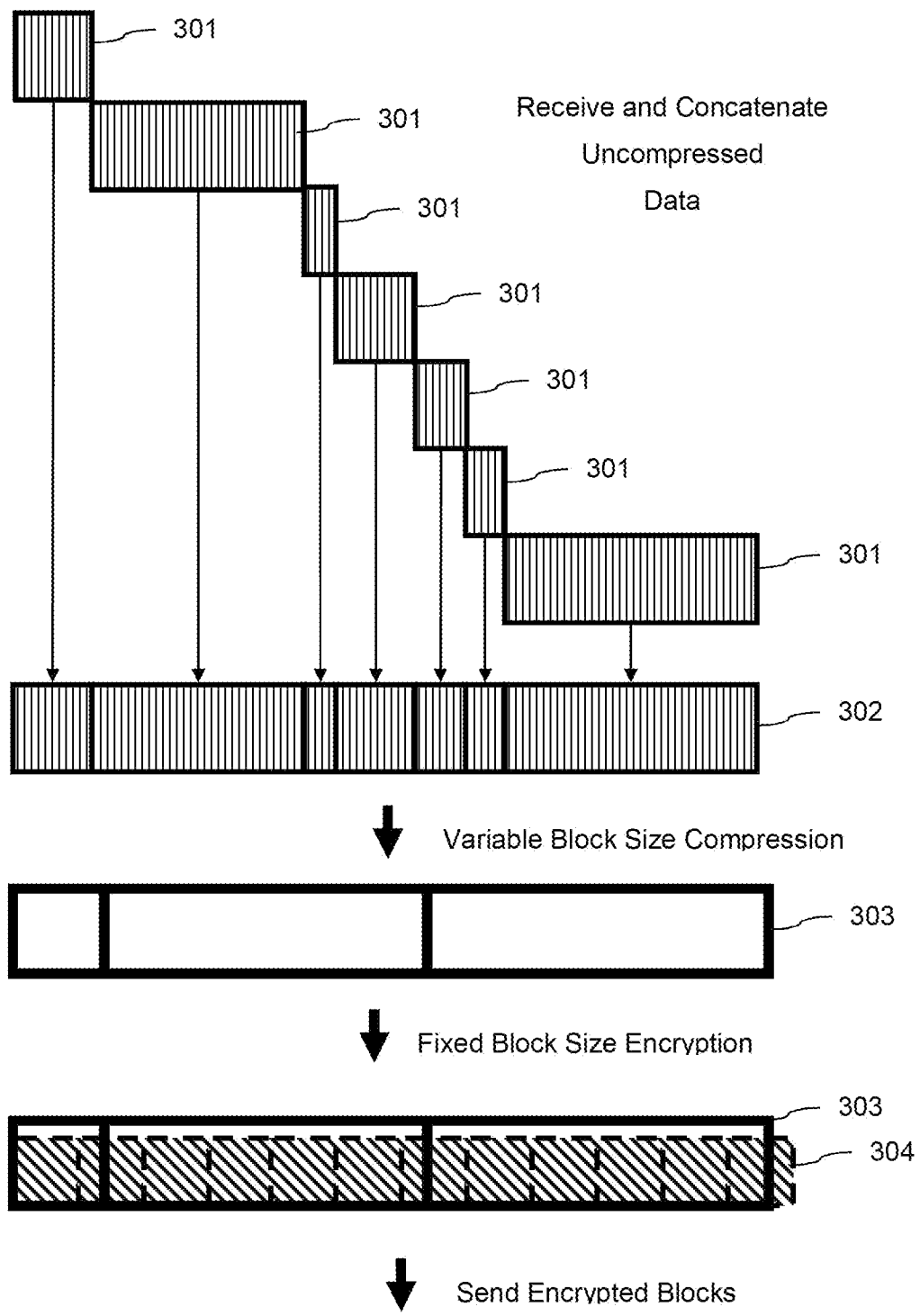
FIG. 3 is a diagram depicting packaging of variable sized blocks for delivery to a user device according to aspects of the present disclosure.

To better visualize the packaging of compressed or uncompressed files for delivery, FIG. 3 depicts a method for packaging, application data according to aspects of the present disclosure. As shown compressed or uncompressed files and other data types 301, may be received by the market place server over a network or received by a packaging tool application. The server or tool may concatenate the compressed or uncompressed files and other data types 301 into a single continuous data set 302. The continuous data set may then be divided into variable sized chunks and each variable sized data chunk may then be compressed and merged together to generate compressed variable sized chunks of application data 303. The variable sized chunks of compressed application data are further divided into fixed sized blocks and encrypted; generating encrypted fixed sized blocks, which contain portions of compressed variable sized chunk application data 304. The encrypted fixed sized blocks may then be sent to a client device.

Figure 4:
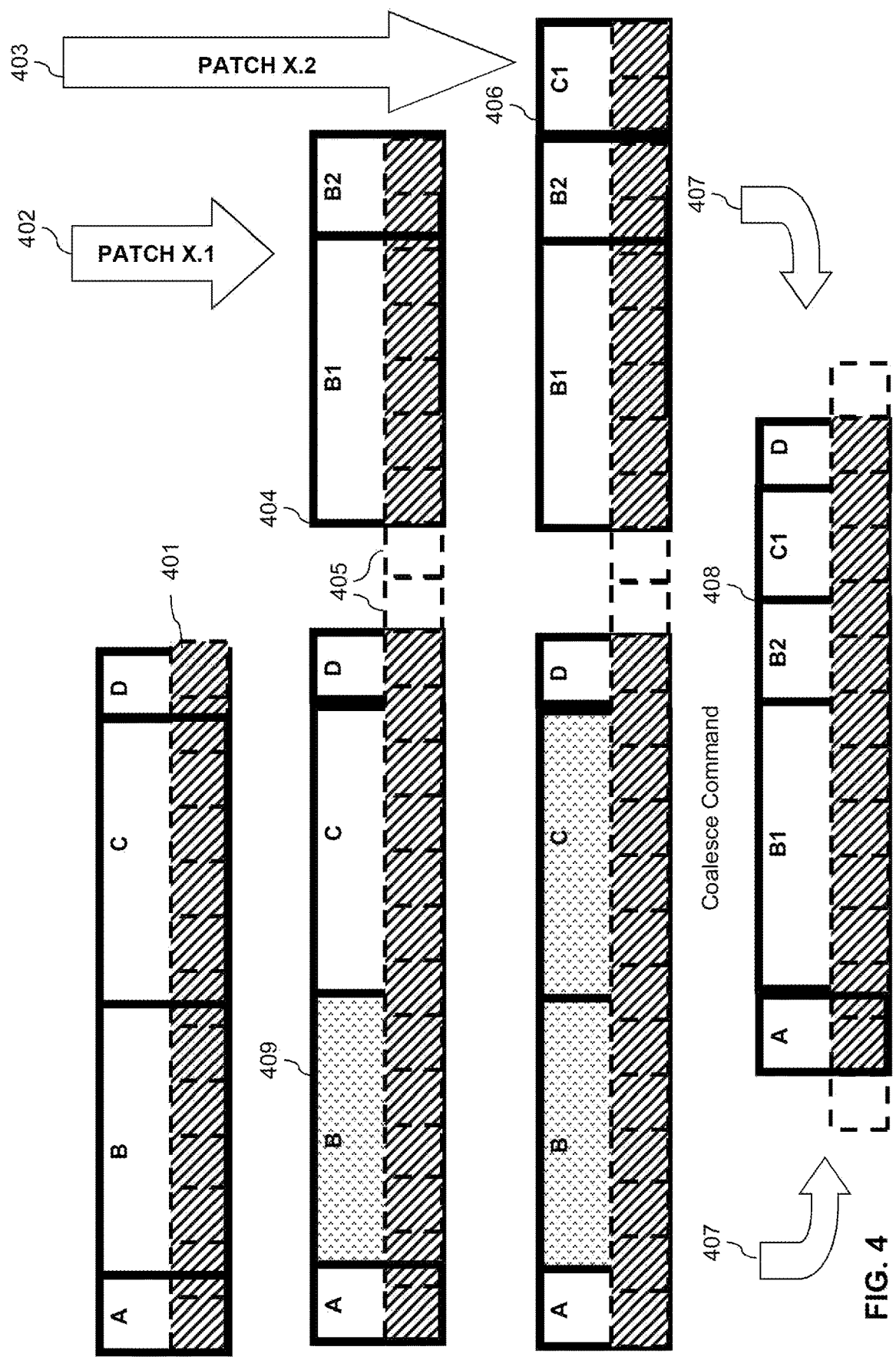
FIG. 4 is a diagram showing file system updating with variable sized blocks and coalescing according to aspects of the present disclosure.
Figure 5:
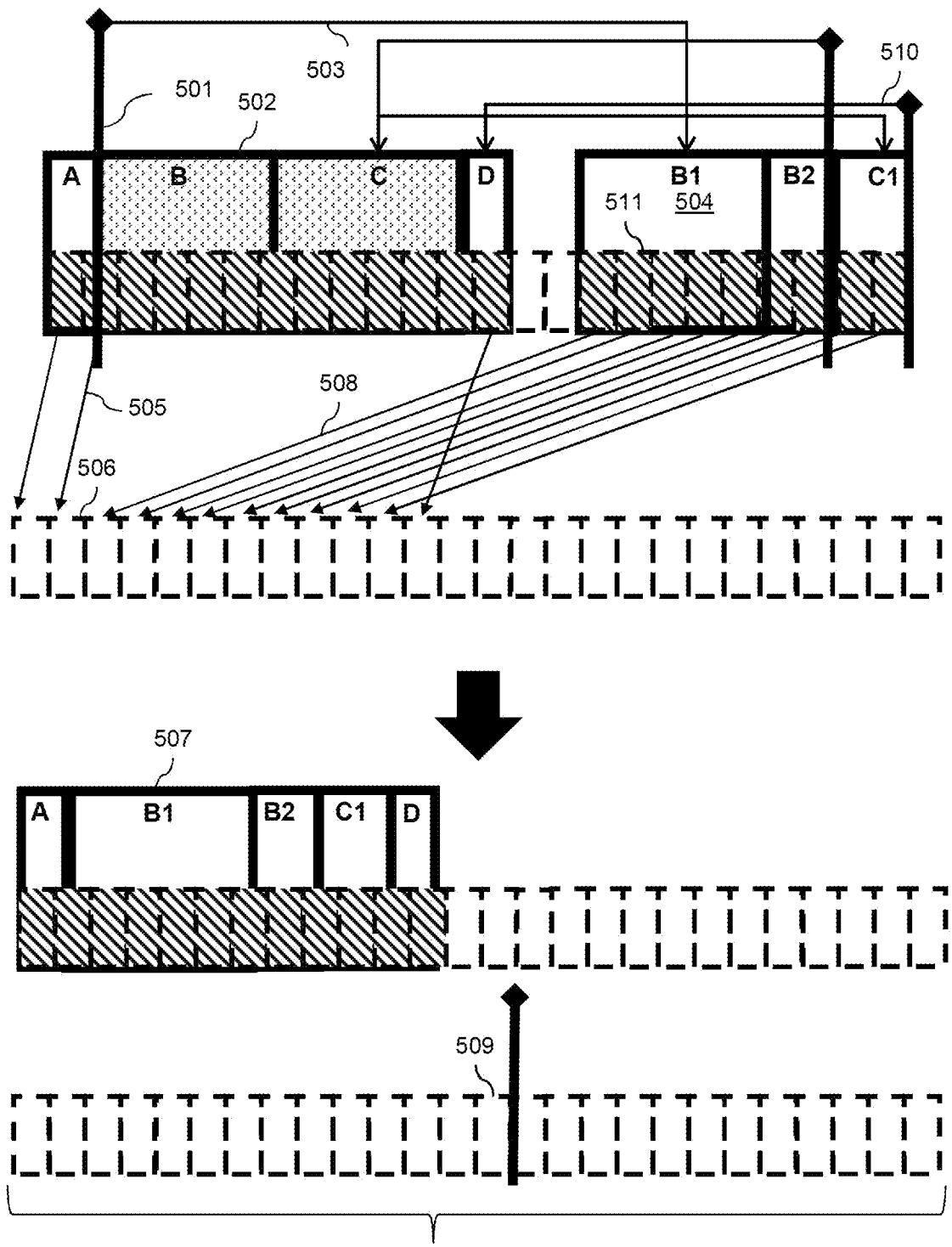
FIG. 5 is a diagram showing coalescing application and patch data according to aspects of the present disclosure.

FIG. 4 and FIG. 5 illustrate examples of patching and data coalescence using variable sized chunks according to aspects of the present disclosure. As shown in FIG. 4, initially a client device may have application data 401 stored on the device in for example in any suitable memory or data storage device. As discussed above the application data may be encrypted in fixed sized blocks and compressed in variable sized chunks.

During the patching process, a client may receive updates 402. These updates may consist of only patch data that is non-referable 404. To minimize erasures and writes, application data that is replaced by the patch data is simply invalidated 409 in metadata and reference to the location of the patch data is placed in the metadata. The location of the patch data may be different from the location of the application data, as other data blocks 405 may have been written to memory in the time between writing the application data to memory and writing the patch data to memory. Additionally, the patch data need not be a simple 1:1 replacement of application chunks with patch chunks. For instance, in the prophetic example shown in FIG. 4, the application chunk B has been replaced by two patch chunks B1 and B2.

Additional patches 403 may be pushed by the application developers. In the example shown in FIG. 4, the location of this additional patch data was next to the previously received patch X.1. If X.1 was received contemporaneously with X.2 or no other writes to memory occurred between when X.1 was received and X.2 was received there is no gap in the memory blocks between X.1 and X.2. As before, application data chunk C has been invalidated in metadata and a reference in the metadata has been placed to patch data chunk C1. A result of this patching scheme is that as more and more patches are added for application data, the patch data becomes spread out across the data storage. Data spread out across a memory space is called file or data fragmentation. Although modern SSDs do not suffer as badly from the effect of data fragmentation as HDDsif data is very heavily fragmented in an SSD it will effect read bandwidth for the drive because multiple different blocks must be accessed. As such, the patching process may implement remote triggering of data coalescence to reduce data fragmentation.

Remote Triggering of Data Coalescence

After updating or before being sent to a client device, a fragmentation metric for the application and patch data is taken. By way of example, and not by way of limitation, the fragmentation metric may for example be the read bandwidth for the application and when the read bandwidth drops below a threshold the patching process will issue a coalesce command 407 Another example of fragmentation metric may be without limitation wasted space due to dead data over storage space. In some embodiments the tool or server may model the data stored on the client device and use this model to calculate the fragmentation metric before updating.

FIG. 5 shows the operation generated with the remote triggering of a coalesce command. When a coalesce command is issued instructions are sent so that the application data is read in linear fashion 501. The application data is written 505 to a new location in memory 506 and erased 509. When a reference 503 to patch data is encountered the invalid application data 502 is erased 509 and the patch data is read 504, written to the new location in memory in place of the invalidated application data 508 and erased 509. In some implementations, the patch data is read, then decrypted and re-encrypted before being written.

After patch data referenced in the metadata has been written and erased, the system reads the next application data in sequence 510 writes the application data to the new location and erases the read application data. This process continues to until all of the application data and patch data has been read, written to the new location and erased at their old location 509. The result is that the application and patch data, which spanned multiple locations in memory, have now been condensed into a single new location 507, 408. In some implementations, the erasure of application and patch data does not occur until all of the application and patch data has been written to the new location. In other embodiments, the application and patch data is erased shortly after it is written in to a new location. In yet other embodiments, the erasure occurs before the block of application data or patch data is written to a new location. A marker may be placed in metadata that directs system to the new location for the application and patch data.

In some cases the variable sized chunks do not evenly divide into existing data blocks as such during the coalesce operation. In such cases, variable sized chunks of application data and patch data may be merged in some fixed sized blocks. Additionally, during the coalesce operation example shown in FIG. 5, the blocks on storage associated with the variable sized data chunks A, D, and patch data B1, C1 may be read and erased and re-rewritten without the data from the variable sized chunks. In other embodiments, the blocks on storage associated with the variable sized data are simply left un-erased and a reference is placed in metadata telling the system the new location of the application and patch data. This is because the beginning of the variable sized chunk and the fixed sized block during writing may not align perfectly. Imperfect alignment means that the fixed sized block may have information from other applications, which are not intended to be modified. The location of the start and end of the variable sized chunks within the fixed sized blocks may be listed in metadata.

In embodiments of the present disclosure, the data blocks 511 may be encrypted as fixed sized blocks. In such cases, extra steps must be performed to coalesce the data. After the read operation is performed, the encrypted data blocks 511 must decrypted. The decrypted data is then stored in working memory 505 and combined with other decrypted variable sized chunk data 506. The decrypted data is combined according to the size of fixed size blocks. This combination is performed to ensure that when the variable sized chunks are written at the new location the fixed sized blocks will be aligned with the memory blocks of the client device. Additionally during this operation, an offset may be applied to the first fixed sized block of the variable sized chunk to account for memory blocks in the client device having some existing data at the location the coalesced application and patch data is to be written. After the data is combined in fixed sized blocks, the blocks are encrypted and written to the new location 506.

The above-described process of data coalescence may be triggered by a fragmentation detected by a client device and performed by the client device. Alternatively, metrics may be sent to the market place server and the marketplace server may issue the coalesce command. Alternatively, the fragmentation metrics may be calculated by the marketplace server using model of the stored application in the client device and the market place server my issue coalesce commands based on the fragmentation metrics generated from the model.

Data Change Detection

Figure 2:
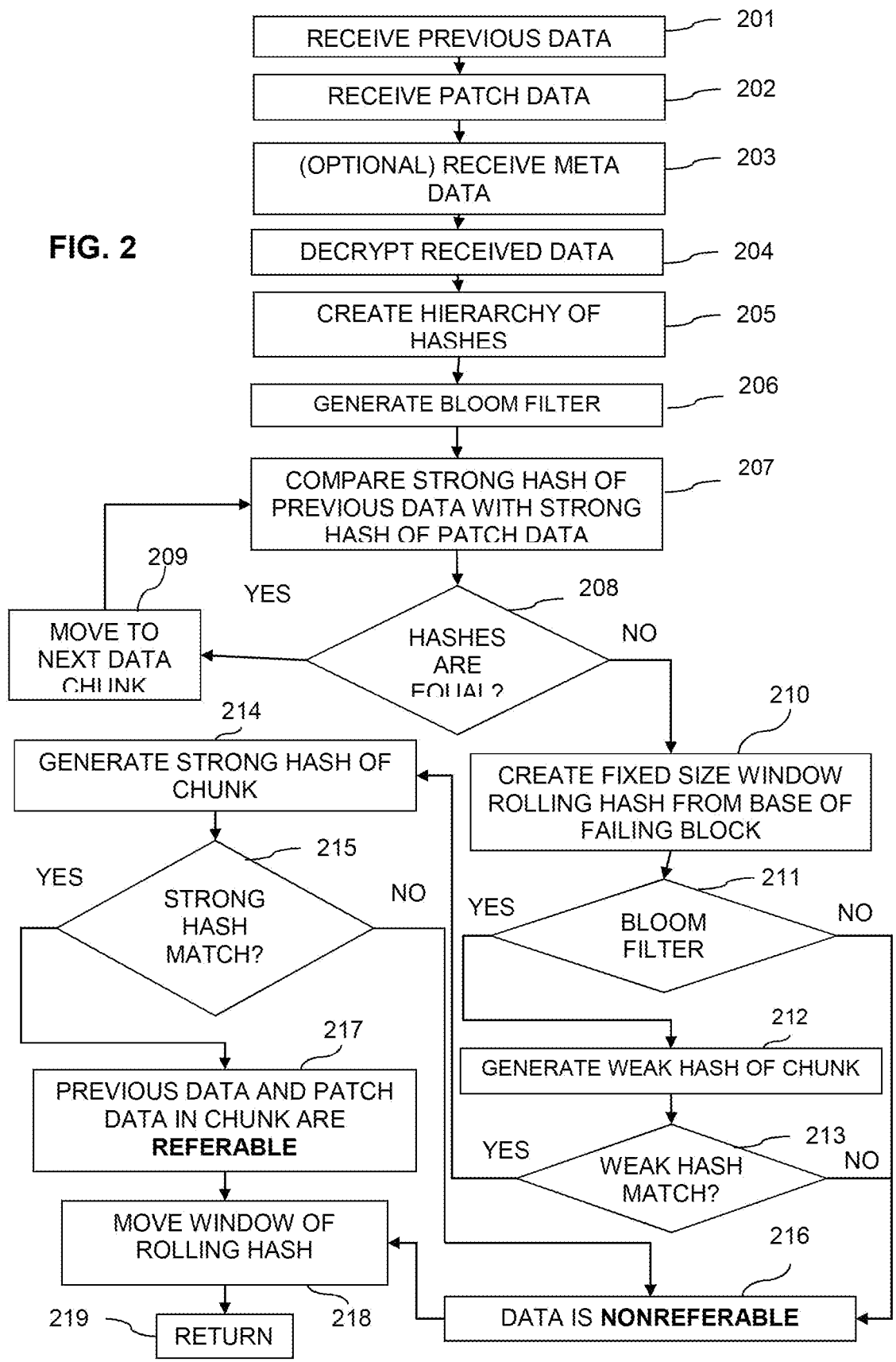
FIG. 2 is a flow diagram depicting a method for detecting changes in update data having variable sized blocks according to aspects of the present disclosure.

FIG. 2 depicts the method for detecting changes in patch data according to aspects of the present disclosure. Patch data may be received by a third party marketplace server or by the packaging tool, as indicated at 202. The tool or the server may have previously received application data or application data may be received concurrently with the patch data or after receiving the patch data, as indicated at 201. According to aspects of the present disclosure, patch data may be received by the tool or server with application data. To patch the application data, the data added or changed by the patch must be extracted from the previous versions of the application data (hereinafter application data) to deliver efficient updates to clients. To aid in this operation, metadata regarding the application may optionally be received with the application data, as indicated at 203 or may be stored in memory from a previous packaging operation. The received application data, patch data, and metadata may be encrypted to protect against piracy and the tool or server may decrypt received encrypted data, as indicated at 204.

The patch data and application data may already be divided into compressed variable sized chunks, as such the patch data may be decompressed and after decompression, each variable sized chunk of the application data may have a hierarchy of hash values generated for it, as indicated at 205. The hierarchy of hashes may be, for example and without limitation, a strong hash and weak hash computed for the whole of the chunk or a subset of data within the chunk. Additionally this hierarchy may include a rolling hash value for the first window of the chunk data to detect byte level change. In some implementations, application data and/or previous patch data may also be decompressed and have a hierarchy of hashes generated for it. In other embodiments, the metadata or some other memory location may have a hierarchy of hashes associated with each chunk in the application data.

A bloom filter is created from the rolling hashes for the application data 206. According to some aspects of the present disclosure the rolling hash values may be generated for the first rolling window of each variable sized block. According to other aspects of the present disclosure, rolling hash values may be generated for each window across each variable sized block. Additionally the bloom filter many contain hash values for chunks of the entire application or a specific set of chunks for example and without limitation only the previous version of a file.

The value of a strong hash of the variable sized patch data chunk is compared, as indicated at 207 to the hash values of each of the application chunks, a hash table may be generated for every strong hash of application data. A decision is made at 208 based on the comparison of strong hashes. When the strong hash of the patch data matches a hash of an application data chunk the next variable sized chunk in the patch data is selected, as indicated at 209 for comparison at 207 as the patch data is a duplicate of existing application data.

When no equivalent strong hashes are found a rolling window hash of the first window of the variable sized patch data chunk is created from the base of the failing variable sized patch data chunk, as indicated at 210. The sized of the rolling window may be, without limitation, smaller than 64 KiB.

The window of the rolling hash of the variable sized patch data chunk is searched for in the bloom filter, as indicated at 211. Where no match in the bloom filter is found, the byte at the base of the current window is determined to be non-referable data for the purposes of patching, as indicated at 216. The window then moves to the next position, as indicated at 218 and the bloom filter is applied, starting the process over, as indicated at 219, restarting at 211 for a new window position. Alternatively, the process reaches the end of the variable sized patch data chunk and the process starts over 219 at 207 or the process reaches the end of the patch data and ends 219.

If a match for window of the rolling hash of variable sized patch data chunk is found in the bloom filter then a weak hash value for the matching variable sized patch data chunk is generated 212. The weak hash starting at the base of the matching window of the variable sized patch data chunk is compared to the weak hash of the matching application data chunk found in the bloom filter at 213. If there are no matches, the byte at the base of the current window is determined to be non-referable data for the purposes of patching at 216. The window then moves to the next position at 218 and the bloom filter is queried, starting the process over by returning at 219 to search the window of the rolling hash of the patch data in the bloom filter at 211 for the new window position. Alternatively, the process reaches the end of the variable sized patch data chunk and the process starts over by returning at 219 to the hash comparison at 207 or the process reaches the end of the patch data and ends at 219.

If an exact match of the hash of the patch data chunk is found in the hashes of the application data then a strong hash is generated of the patch data chunk and application data chunk at 214. The strong hashes of the matching windows of application data and patch data are compared at 215. If the strong hashes of the matching windows are not identical then the byte at the base of the window of patch data is determined to be non-referable data for the purposes of patching 216. The window then moves to the next position at 218 and the bloom filter is queried, starting the process over by returning at 219 to search the window of the rolling hash of the patch data in the bloom filter at 211 for the new window position. Alternatively, the process reaches the end of the variable sized patch data chunk and the process starts over by returning at 219 to the hash comparison at 207 or the process reaches the end of the patch data and ends at 219.

If the strong hash of the chunk of patch data is equivalent to the strong hash of a chunk of application data then the patch data is determined to be referable at 217. If the location of the referable window of patch data is different front the location of the window in application data a reference may be placed in metadata referring to the location in application data for the referable patch data. Otherwise, the referable chunk of patch data is deemed redundant and may not be required to be sent with patch during the patching process. If the location of the referable chunk of patch data is different from the location of the chunk in application data a reference may be placed in metadata referring to the location in application data for the referable patch data. Otherwise, a reference may not be required to be sent with patch during the patching process. After it is determined that, a chunk of patch data is referable; the window then moves to the next position at 218 and the bloom filter is applied, starting the process over by returning at 219 to the bloom filter search at 211 for the new window position. Alternatively, the process reaches the end of the variable sized patch data chunk and the process starts over by returning at 219 to the hash comparison at 207 or the process reaches the end of the patch data and ends at 219.

According, to aspects of the method for detecting changes in patch, data may also be applied to patched applications. In cases where the application has already had patches pushed to the client, the application data is considered to encompass patch data that has been provided to client in previous patches. As such in these embodiments, all comparisons with application data also include patch data previously sent to the client device.

Non-referable data is new unique data that has not been provided to client devices or previously seen by the application. Ideally, non-referable data will make up the majority of patch data sent to client devices during the patching process. Referable data on the other hand, may be data that is found in other parts of the application. This data may be found within a window of a data chunk and thus while the chunk as a whole may not be referable, because of some non-referable windows of data within the chunks, portions of the chunks may be identical to application data. In some embodiments where referable and not referable data are found within the same chunk two separate chunks may be created. See FIG. 6 for more information about splitting and merging of referable and non-referable chunks.

Figure 6:
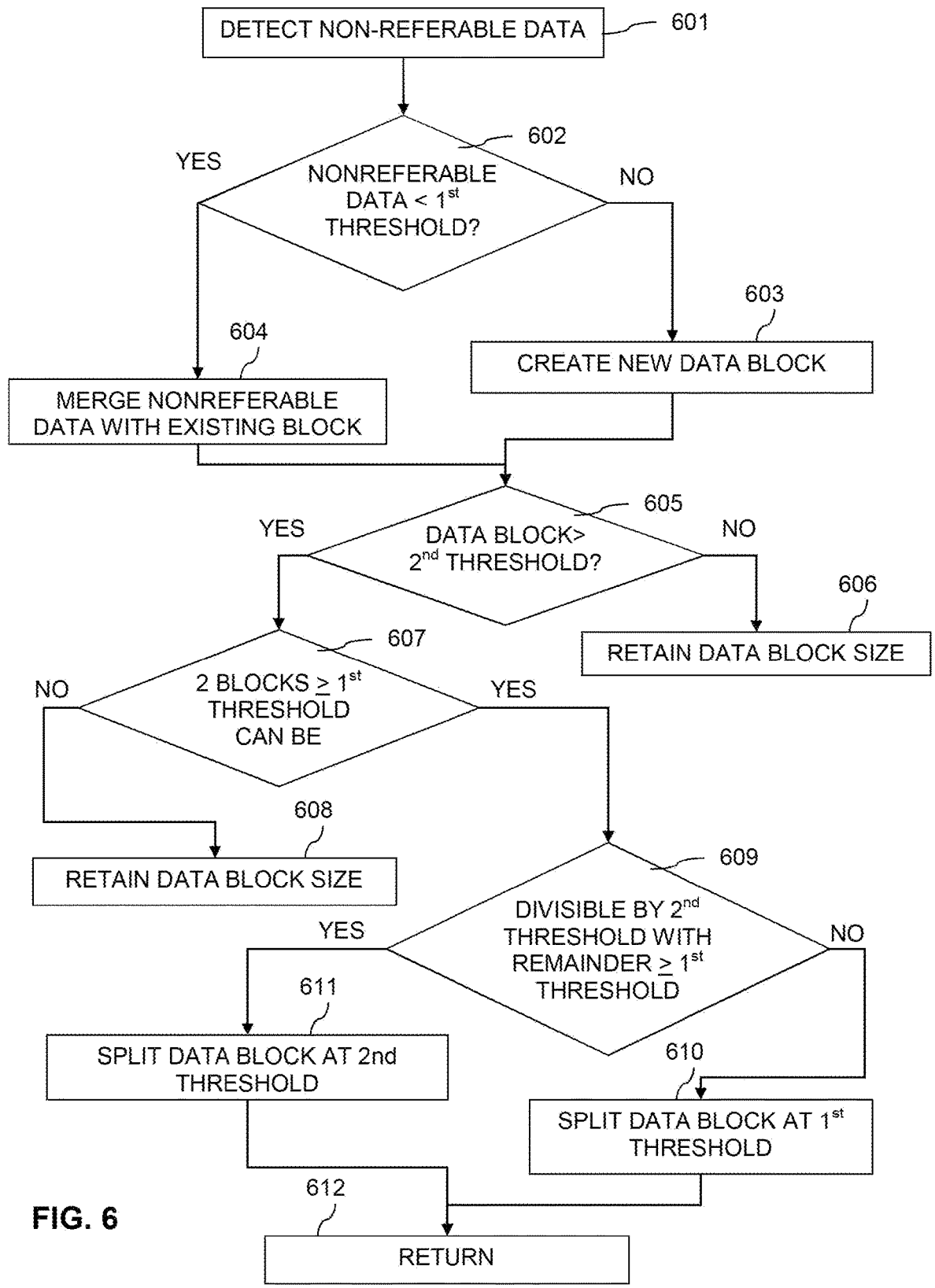
FIG. 6 is a block diagram showing the method for determining block referability according to aspects of the present disclosure.

FIG. 6 depicts a method for merging and splitting variable sized chunks according to aspects of the present disclosure. The merge and split operation may be performed by a tool used by the application developer or at the market place server according to aspects of the present disclosure. Merge and split operations may occur after portions of variable sized data chunks are determined to be non-referable at 601 (hereinafter referred to as non-referable data). The method for non-referable data detection described in FIG. 2 may be used to detect the non-referable data. Once detected, the non-referable data is compared to a first threshold at 602. The first threshold may be, for example and without limitation a merge threshold of 128 KiB. If the size of the non-referable data is not less than the threshold then, a new variable sized data chunk is created out of the non-referable data at 603. If the non-referable data is less than the first threshold then it is merged with neighboring referable application if available at 604. According to aspects of the present disclosure the first threshold may be empirically derived from different factors effecting storage operation. For example and without limitation, the relative reduced compression ratio of smaller sized chunks, encapsulating within a variable sized chunk the smallest possible changed region, setup costs for decompression based on hardware capabilities and the like.

Next, either the new data chunk or the merged data chunk is compared to a second threshold at 605. This second threshold may be, without limitation, a block length threshold of 240 KiB. It should be noted that in some implementations the second threshold is always larger than the first threshold. If the size of the merged data chunk or the new data chunk is smaller than the second threshold then size of the new data chunk or merged data chunk is retained and no further split or merge operation is performed on those data chunks at 606. On the other hand, if the size of the new data chunk or the merged data chunk is greater than the second threshold then another comparison is applied to the data. The threshold comparison is whether two variable sized chunks can be created wherein each chunk is greater than the first threshold at 607. If two blocks greater than or equal to the first threshold cannot be created from the merged or new data chunks the size of the data block is retained at 608 and no further comparisons are made. If the two blocks greater than the first threshold can be created then a final comparison is made.

The final comparison is whether new data chunk or the merged data chunk is divisible by the second threshold with a remainder that is greater than or equal to the first threshold at 609. If the remainder of the division is greater than or equal the first threshold then the merged data chunk or the new data chunks is split at the size of the second threshold at 611. If the size of the remainder is less than the first threshold then the chunks are split at the size of the first threshold at 610. After the split operation has been performed the system returns to normal operation at 612

Update Optimization Using Feedback

Figure 7A:
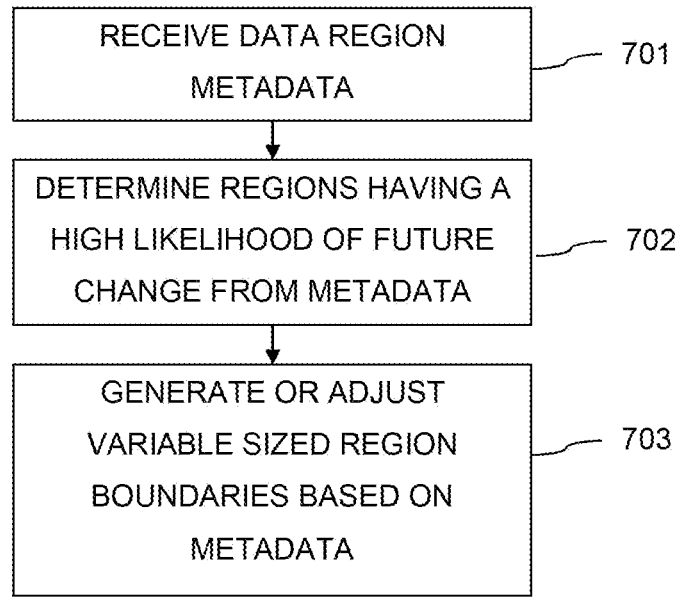
FIG. 7A is a block diagram depicting the method for packaging data using feedback on probability of data change according to aspects of the present disclosure.

FIG. 7A depicts an example of a method for application package optimization using feedback on the probability of change for regions of data. As part of the patching process, an application developer may provide information to the tool or the server about the application at 701. This application metadata may include information about the likelihood of change in regions of the data. Alternatively, the application metadata may include labels for different regions of the application data. From this application metadata, regions having a high likelihood of change are determined at 702.

For example and without limitation, the application metadata may simply indicate that certain regions of the data contain data is likely to change in later patches. In other embodiments, the metadata may label certain regions of that data such as the header and the table of contents. Data in the table of contents may be labeled as having a high likelihood of change as this information is often changed every time a new patch is added.

Once the regions of application data having a high likelihood of change are determined, variable sized data chunks can be created based on regions of application data that have a high likelihood of change at 703. Alternatively, the boundaries of the variable sized blocks of application data may be adjusted to fit the regions having a high likelihood of change. In other implementations according to aspects of the present disclosure, the boundaries of the variable sized blocks of application data may be fit around regions provided by the user, those regions having a relatively low probability of change. Generation of adjustment of variable sized data chunks may be performed for example and without limitation by creating a variable sized data chunk that encompasses the data that has a high likelihood of change and ends at data that has a lower likelihood of change. Alternatively, the boundaries of existing variable sized chunks may be adjusted so that a chunk containing a lot of data that has a high likelihood of change has an end boundary at data that does not have a high likelihood of change. Improve efficiency is created because during a erase write cycle data with a low likelihood of change does not get caught in deletions and have to be rewritten with every change. Additionally the download size of patches is reduced as areas as the boundaries between blocks are better defined and there is less overlapping data transmitted during patching.

Figure 7B:
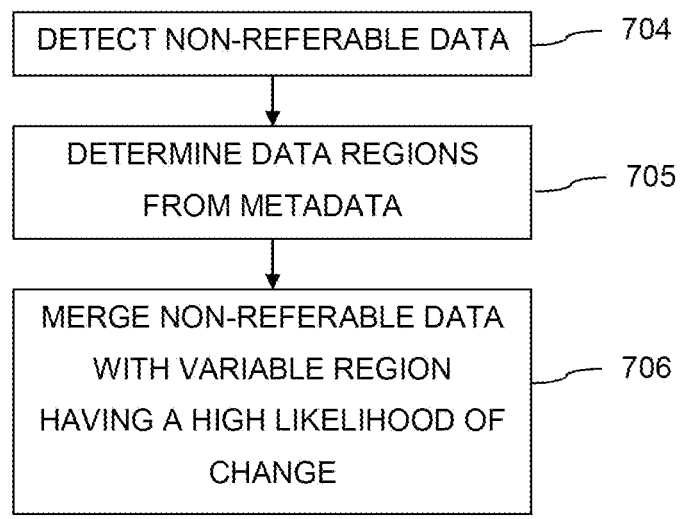
FIG. 7B is a block diagram showing the method for updating and merging data using feedback on probability of data change according, to aspects of the present disclosure.

FIG. 7B shows a method for patch data merging using feedback on the probability of change for regions of data. The application developer may provide metadata about the likelihood of regions of patch data and application data will change at 704. The metadata may be used to determine which regions of patch data are likely to be changed in future patches at 705. Using this information creation of variable sized patch data chunks may be guided. For example and without limitation neighboring patch data that is determined to have a high likelihood of change may be included in a variable sized patch data chunk while other patch data not determined to have a high likelihood of change may be included in a different patch data chunk. Additionally where merging operations are performed, the patch metadata and application metadata may guide the merge operation. For example where a non-referable region of patch data is determined and merging is appropriate, if it is determined that the non-referable patch data has a high likelihood of change then the merge operation may be performed with neighboring referable data that also have been determined to have a high likelihood change at 706.

Figure 8:
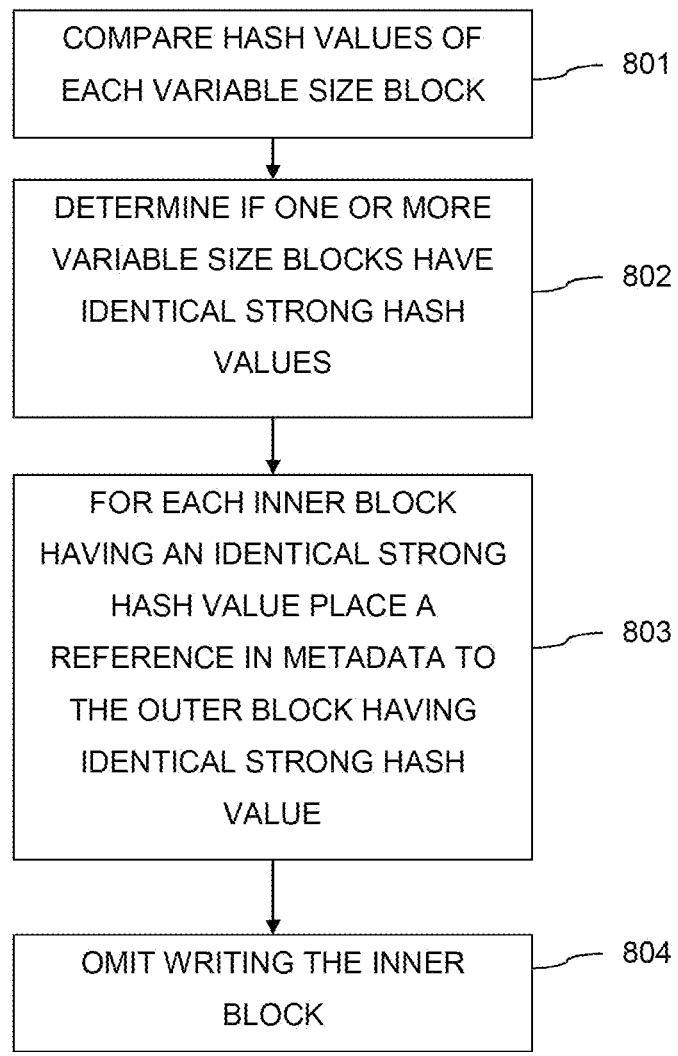
FIG. 8 is a block diagram showing the method for variable sized block deduplication according to aspects of the present disclosure.

According to aspects of the present disclosure, during packaging, application data and patch data may undergo deduplication to reduce the amount of writes made on the client device. FIG. 8 depicts an example method for deduplication according to aspects of the present disclosure. In the deduplication procedure, the strong hash values of each variable sized chunk of the application with each other variable sized chunk of the application or a subset of the variable sized chunks at 801. From the comparison it is determined if any variable sized chunk in the application has identical data with another chunk of the application at 802. If two variable sized chunks are determined to have identical data, only first identical variable sized chunk is written to storage. A reference to the location of each block in storage associated with the first identical variable sized chunk is placed in metadata for the second variable sized chunk at 803 and omit writing blocks associate with the duplicated compressed variable sized chunk to storage 804.

Figure 9:
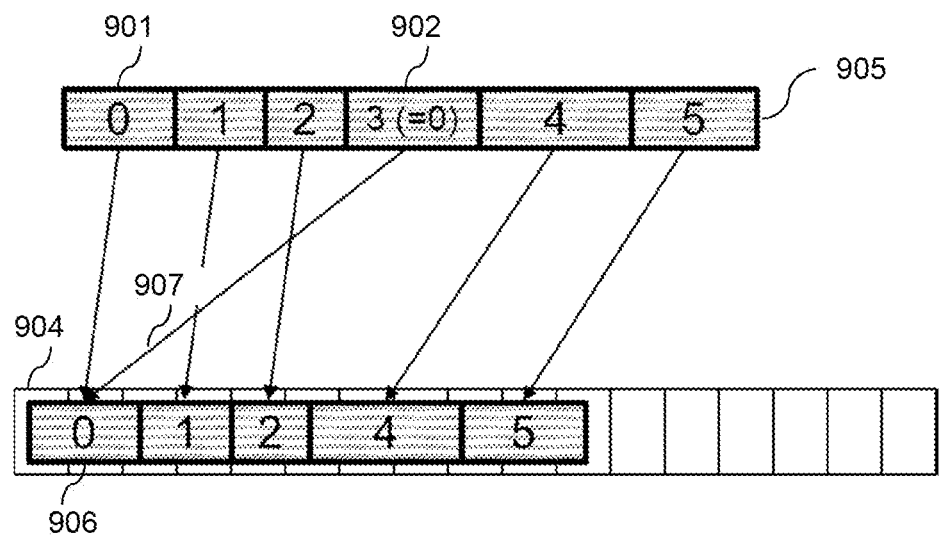
FIG. 9 is a diagram showing variable sized block deduplication according to aspects of the present disclosure.

FIG. 9 shows the memory blocks 904 and metadata 905 after a deduplication. As shown variable sized chunks 0, 1, 2, 4, 5 are written across multiple fixed sized memory blocks. The metadata 905 contains information for variable sized chunks 0, 1, 2, 3, 4, 5. In the illustrative case variable sized chunks, 0 and 3 are identical and as such the deduplication process omits chunk 3 when the data chunks are written to memory. In the metadata, variable sized chunk 0 901 references the variable sized chunk 0 in memory 906. After deduplication the metadata for variable sized chunk 3 902, references 907, the variable sized chunk 0 902 in memory.

Application Patching System

Figure 10:
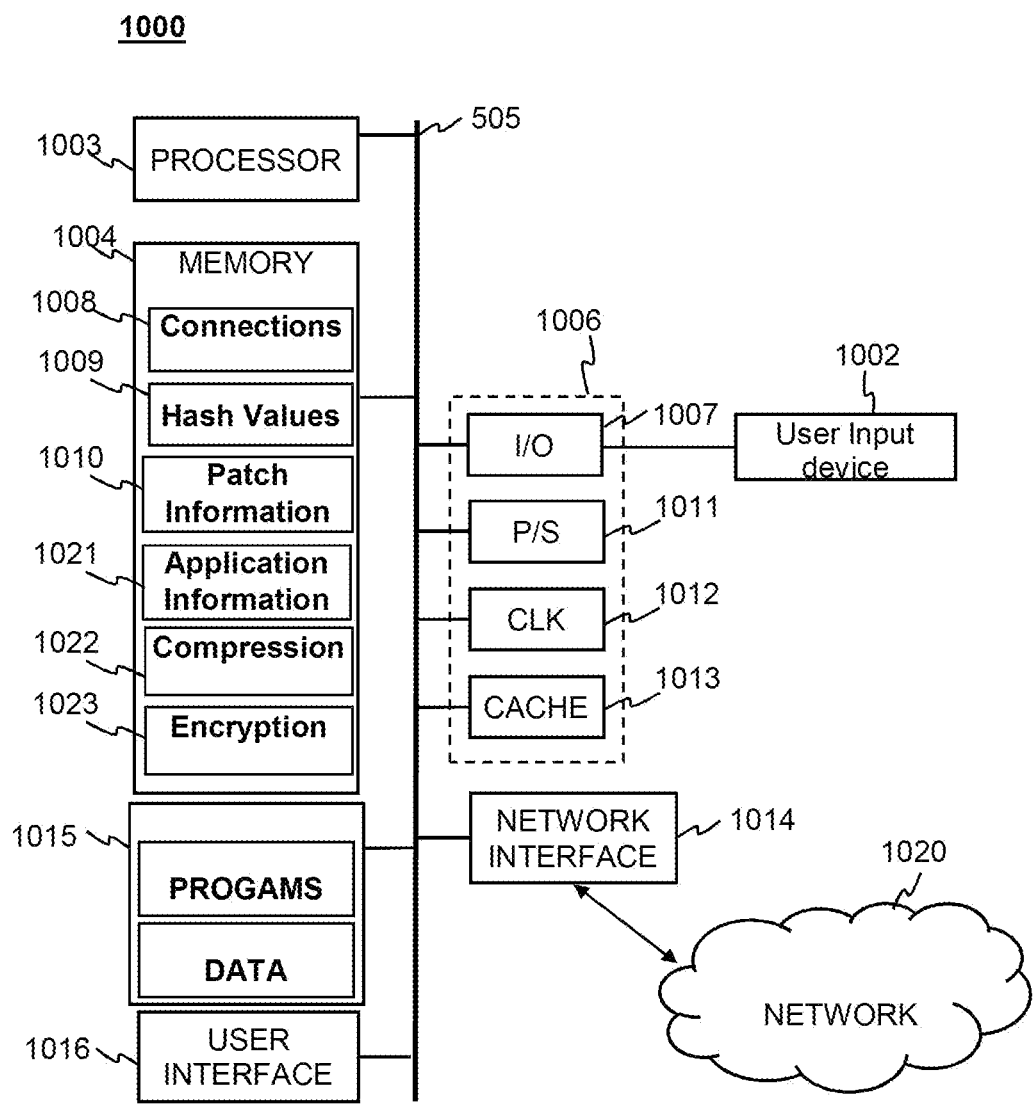
FIG. 10 is a block diagram showing a system for packaging data using variable sized blocks according to aspects of the present disclosure.

FIG. 10 depicts a system 1000 configured to package application data and patch data or store application and patch data according to aspects of the present disclosure. The system 1000 may include one or more processor units 1003, which may be configured according to well-known architectures, such as, e.g., single-core, dual-core, quad-core, multi-core, processor-coprocessor, cell processor, and the like. The system may also include one or more memory units 1004 (e.g., random access memory (RAM), dynamic random access memory (DRAM), read-only memory (ROM), and the like).

The processor unit 1003 may execute one or more programs 1017, portions of which may be stored in the memory 1004 and the processor 1003 may be operatively coupled to the memory, e.g., by accessing the memory via a data bus 1005. The programs 1017 may be configured to download application information 1021 including application data and package the application information according to the application packaging method described above with respect to FIG. 1 and/or FIG. 3 and/or FIG. 4. Additionally, the Memory 1004 may contain information about connections 1008 between the system and one or more application developer servers or networks as well as client devices. Such connection information may include, e.g., internet protocol (IP) addresses, network address translator (NAT) traversal information, and connection performance information, such as bandwidth and latency. Patch data 1010 may also be stored in memory 1004. The programs 1017 may also be configured to download patch data 1010 and package the patch data according to the patching method with variable sized data chunks depicted in FIG. 2 and/or FIG. 5. As part of packaging and patching, the programs may generate hash values for the application and/or patch data these hash values may be stored in memory 1009 before being added to the application information as metadata. Additionally as the memory, 1004 may contain compression data 1022 and/or one or more encryption data 1023 for use during packaging application and/or patch data. Programs may also be configured to modify variable sized application chunks based on application metadata according to the method described in FIGS. 7A and 7B. In addition, the Memory 1004 may contain application information 1021 such as metadata about the size of application chunks, number of application chunks that make up the application, order of application chunks, and likelihood of change associated with the application chunks. The application information, patch information, hash values, compression data, encryption data and connection information may also be stored as data in the Mass Store 1015.

The system 1000 may also include well-known support circuits, such as input/output (I/O) 1007, circuits, power supplies (P S) 1011, a clock (CLK) 1012, and cache 1013, which may communicate with other components of the system, e.g., via the bus 1005. The system may include a network interface 1014. The processor unit 1003 and network interface 1014 may be configured to implement a local area network (LAN) or personal area network (PAN), via a suitable network protocol, e.g., Bluetooth, for a PAN. The system may optionally include a mass storage device 1015 such as a disk drive, CD-ROM drive, tape drive, flash memory, or the like, and the mass storage device may store programs and/or data. The marketplace server may also include a user interface 1016 to facilitate interaction between the system and a user. The user interface may include a monitor, Television screen, speakers, headphones or other devices that communicate information to the user. A user input device 1002 such as a mouse, keyboard, game controller, joystick, etc. may communicate with an I/O interface and provide control of the system to a user.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for application patching comprising:
   a) concatenating compressed data or uncompressed data or a mixture of compressed and uncompressed data into a continuous data set;
   b) dividing the continuous data set into variable sized data chunks;
   c) compressing each of the variable sized data chunks;
   d) dividing each of the variable sized data chunks into fixed size data blocks;
   e) encrypting the fixed size data blocks to generate encrypted fixed size data blocks;
   f) storing the encrypted fixed sized data blocks or sending the encrypted fixed size data blocks over a network.

2. The method of claim 1, further comprising:
   g) dividing patch data into variable sized patch data chunks;
   h) determining a relationship of variable sized patch data chunks to the variable sized data chunks;
   i) generating patch metadata for the relationship of the variable sized patch data chunks to the variable sized data chunks;
   j) compressing the variable sized patch data chunks to generate compressed variable sized patch data chunks;
   k) dividing the compressed variable sized patch data chunks into fixed size patch data blocks;
   l) encrypting the fixed size patch data blocks to generate encrypted fixed size patch data blocks;
   m) sending the encrypted fixed size patch data blocks and the metadata over the network.

3. The method of claim 1, further comprising generating a variable sized chunk metadata for a location of the variable sized chunks in relation to the encrypted fixed size blocks.

4. The method of claim 1, wherein each of the variable sized chunks is greater than 64 kilobytes in size.

5. The method of claim 1, further comprising deduplicating the variable sized data chunks after said dividing the variable sized data chunks into fixed size data blocks.

6. The method of claim 5, further comprising generating variable sized chunk metadata for the variable sized data chunks, wherein the variable sized chunk metadata includes references for deduplicated chunks.

7. The method of claim 5, wherein deduplicating the variable sized data chunks includes determining hash values for each variable sized block, comparing a hash value of a first variable sized chunk with a hash value of a second variable sized chunk, wherein the first variable sized chunk has a matching hash value with the second variable sized chunk deleting the second variable sized chunk and creating reference in memory to the first variable sized chunk.

8. A system for application patching comprising:
a processor;
a memory coupled to the processor;
instructions embedded in the memory that when executed cause the processor to carry out the method comprising;
 a) concatenating compressed data or uncompressed data or a mixture of compressed and uncompressed data into a continuous data set;
 b) dividing the continuous data set into variable sized data chunks;
 c) compressing each of the variable sized data chunks;
 d) dividing the variable sized data chunks into fixed size data blocks;
 e) encrypting the fixed size data blocks to generate encrypted fixed size data blocks;
 f) storing the encrypted fixed sized data blocks or sending the encrypted fixed size data blocks over a network.

9. The system of claim 8, wherein the method further comprises:
 g) dividing patch data into variable sized patch data chunks;
 h) determining relationship of variable sized patch data chunks to variable sized data chunks;
 i) generating a patch metadata for relationship of the variable sized patch data chunks to variable sized data chunks;
 j) compressing the variable sized patch data chunks;
 k) dividing the variable sized patch data chunks into fixed sized patch data blocks;
 l) Encrypting the fixed size patch data blocks to generate encrypted fixed size patch data blocks;
 m) sending the encrypted fixed sized patch data blocks and metadata over the network.

10. The system of claim 8, wherein the method further comprises generating a variable sized chunk metadata for a location of the variable sized chunks in relation to the encrypted fixed size blocks.

11. The system of claim 8, wherein each of the variable sized chunks is greater than 64 kibibytes in size.

12. The system of claim 8, wherein the method further comprises deduplicating the variable sized data chunks after said dividing the variable sized data chunks into fixed size data blocks.

13. The system of claim 12, wherein the method further comprises generating variable sized chunk metadata for the variable sized data chunks, wherein the variable sized chunk metadata includes references for deduplicated chunks.

14. The system of claim 12, wherein deduplicating the variable sized data chunks includes determining hash values for each variable sized block, comparing a hash value of a first variable sized chunk with a hash value of a second variable sized chunk, wherein the first variable sized chunk has a matching hash value with the second variable sized chunk deleting the second variable sized chunk and creating reference in memory to the first variable sized chunk.

15. A non-transitory computer readable medium having instructions embedded thereon that, when executed, cause a computer to carry out the method for application patching, the method comprising:
 a) concatenating compressed data or uncompressed data or a mixture of compressed and uncompressed data into a continuous data set;
 b) dividing the continuous data set into variable sized data chunks;
 c) compressing each of the variable sized data chunks;
 d) dividing the variable sized data chunks into fixed size data blocks;
 e) encrypting the fixed size data blocks to generate encrypted fixed size data blocks;
 f) storing the encrypted fixed sized data blocks or sending the encrypted fixed size data blocks over a network.

16. The non-transitory computer readable medium of claim 15, wherein the method further comprises
 g) dividing patch data into variable sized patch data chunks;
 h) determining a relationship of variable sized patch data chunks to the variable sized data chunks;
 i) generating a patch metadata for relationship of the variable sized patch data chunks to variable sized data chunks;
 j) compressing the variable sized patch data chunks to generate compressed variable sized patch data chunks;
 k) dividing the compressed variable sized patch data chunks into fixed size patch data blocks;
 l) Encrypting fixed sized patch data blocks to generate encrypted fixed size patch data blocks;
 m) sending the encrypted fixed sized patch data blocks and metadata over the network.

17. The non-transitory computer readable medium of claim 15, wherein the method further comprises generating a variable sized chunk metadata for a location of the variable sized chunks in relation to the encrypted fixed size blocks.

18. The non-transitory computer readable medium of claim 15, wherein each of the variable sized chunks is greater than 64 kibibytes in size.

19. The non-transitory computer readable medium of claim 15, wherein the method further comprises deduplicating the variable sized data chunks after said dividing the variable sized data chunks into fixed size data blocks.

20. The non-transitory computer readable medium of claim 19, wherein said deduplicating the variable sized data chunks includes determining hash values for each variable sized block, comparing a hash value of a first variable sized chunk with a hash value of a second variable sized chunk, wherein the first variable sized chunk has a matching hash value with the second variable sized chunk deleting the second variable sized chunk and creating reference in memory to the first variable sized chunk.

* * * * *